United States Patent [19]

Kershaw

[11] 4,420,315
[45] Dec. 13, 1983

[54] NESTING AIR FILTERS

[76] Inventor: Eli J. Kershaw, 530 Retreat La., Powell, Ohio 43065

[21] Appl. No.: 227,218

[22] Filed: Jan. 22, 1981

Related U.S. Application Data

[63] Continuation-in-part of Ser. No. 136,909, Apr. 3, 1980.

[51] Int. Cl.³ .............................................. B01D 46/10
[52] U.S. Cl. ........................................ 55/501; 55/511;
55/DIG. 31; 206/509; 220/236; 414/30;
414/105; 414/786; 29/469
[58] Field of Search ................. 55/501, 511; 220/23.6;
206/500, 504, 515, 518, 509; 29/469; 414/30,
105, 786

[56] References Cited

U.S. PATENT DOCUMENTS

| 2,965,197 | 12/1960 | Dow et al. ............................ 55/511 |
| 3,386,580 | 6/1968 | Grabarczyk. |
| 3,685,687 | 8/1972 | Eckdahl .............................. 206/504 |
| 3,928,008 | 12/1975 | Peterson .............................. 55/473 |
| 3,938,973 | 2/1976 | Kershaw .............................. 55/501 |

FOREIGN PATENT DOCUMENTS

| 1161511 | 1/1964 | Fed. Rep. of Germany ........ 55/501 |
| 650908 | 10/1928 | France. |
| 1034885 | 8/1953 | France. |
| 719673 | 3/1980 | U.S.S.R. ............................. 55/497 |

Primary Examiner—Bernard Nozick
Attorney, Agent, or Firm—Charles P. Boukus, Jr.

[57] ABSTRACT

This invention provides an improved construction for air filters wherein the filter frame is provided with indentations or recesses adjacent to its opposite corners which allow a plurality of filters to nest together in a laterally offset relationship to conserve space. The invention can be employed with an air filter including a filter element of fibrous material and a frame for supporting the filter element at its marginal edges. Preferably, a set of recesses is formed in the filter frame at positions adjacent to its diagonally opposite corners. Each recess is adapted to receive the frame of another air filter to permit the filters to nest together in a laterally offset relationship for shipment or storage. The air filters are arranged in a stack with alternate filters in the stack diagonally displaced relative to the remaining air filters. The recesses permit each air filter to be nested with one or both of its neighbors.

25 Claims, 26 Drawing Figures

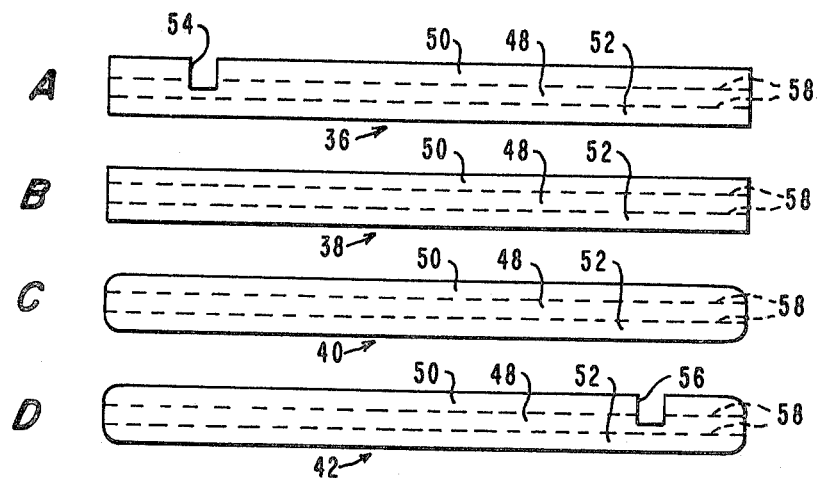
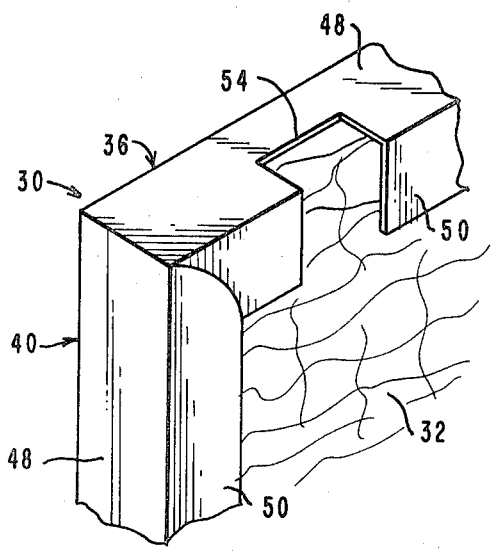
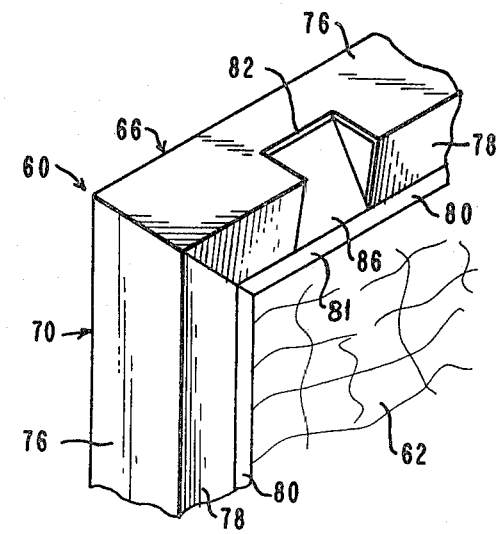
FIG. 7
FIG. 12
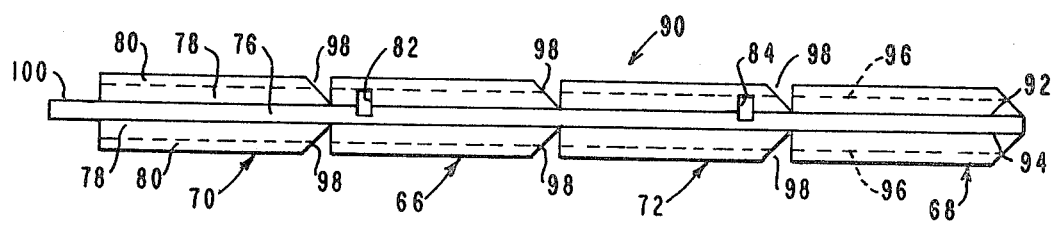
FIG. 13

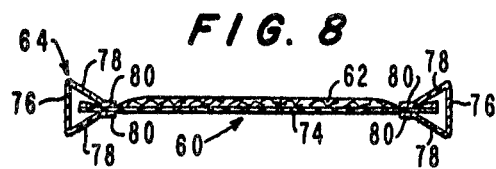
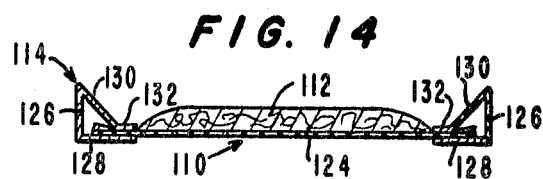
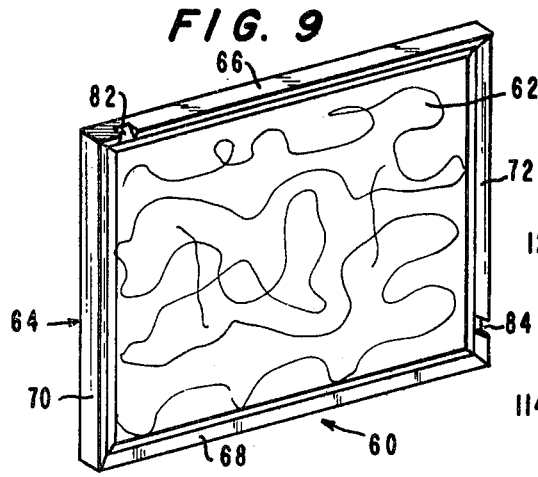
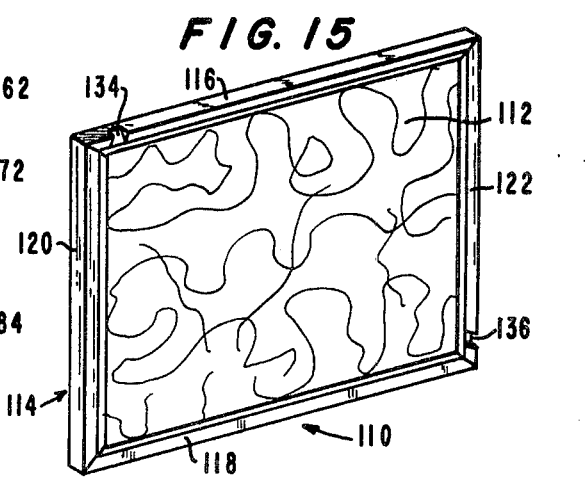
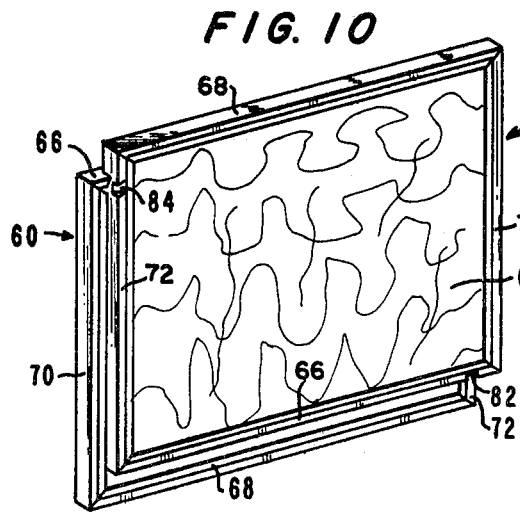
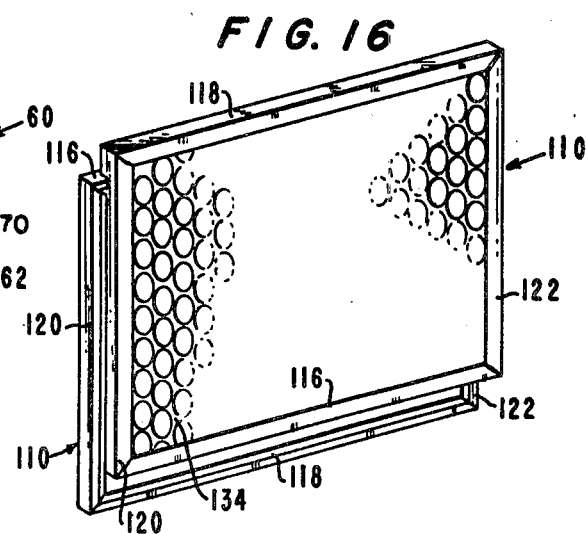
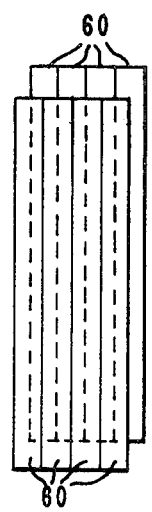

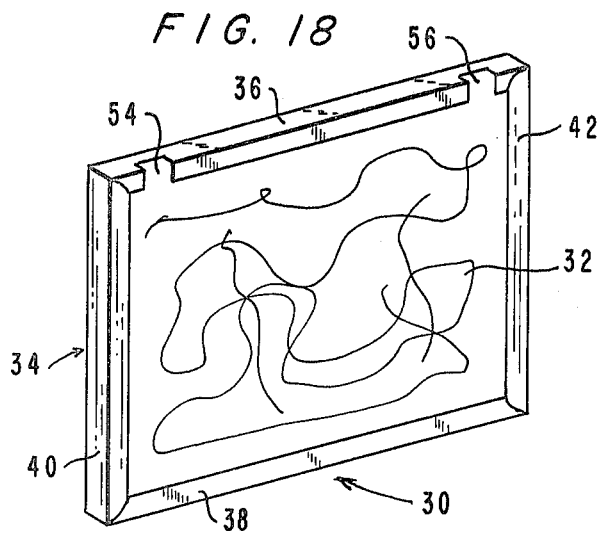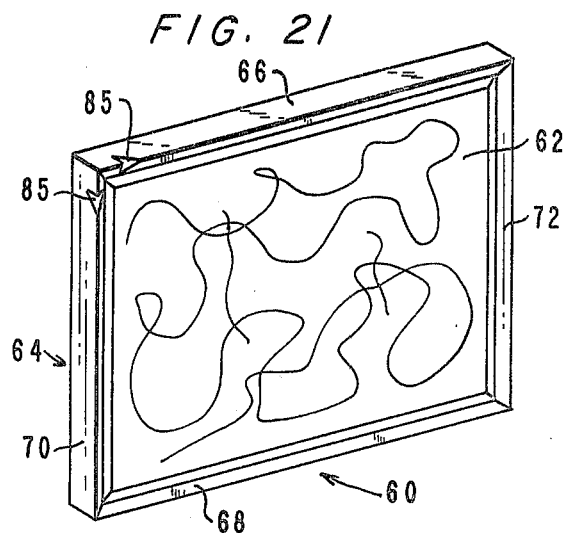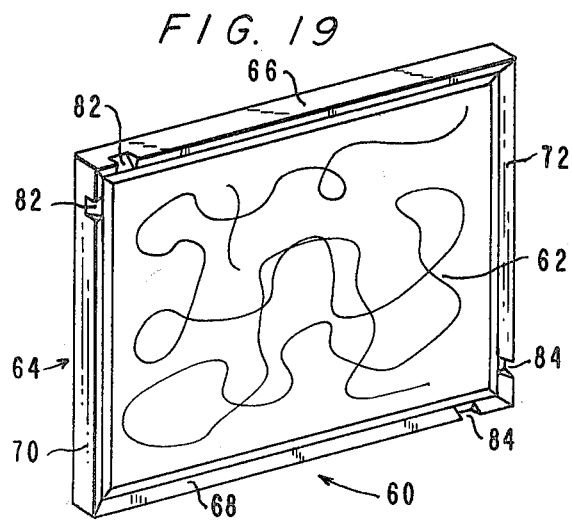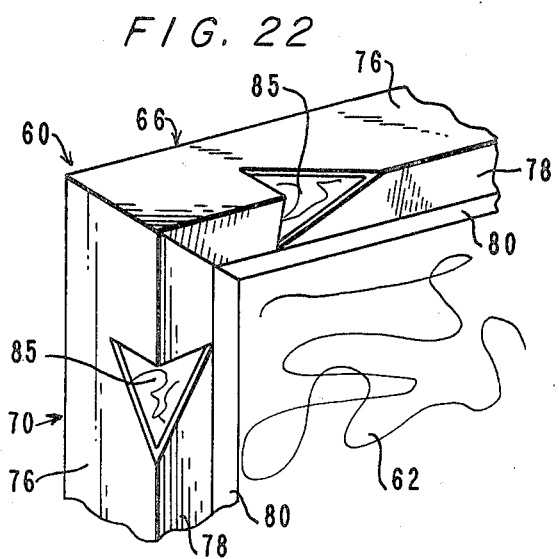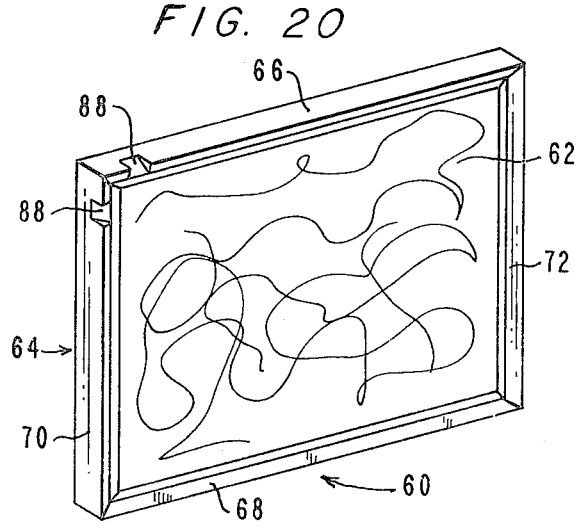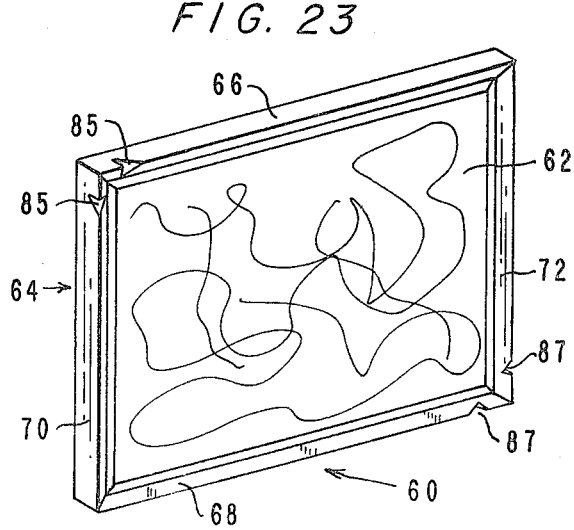

NESTING AIR FILTERS

RELATED APPLICATION

This is a continuation-in-part of U.S. patent application Ser. No. 136,909, filed Apr. 3, 1980.

FIELD OF INVENTION

The present invention relates to air filters and, more particularly, to nesting air filters which are uniquely designed to permit a plurality of air filters to be packed together in a compact space for shipment or storage. Specifically, this invention relates to an improved construction for air filters wherein the filter frame is provided with indentations or recesses adjacent to its opposite corners which allow a plurality of filters to nest together in a laterally offset relationship to conserve space. The invention is particularly advantageous for use with air filters of the type comprising a filter element of fibrous material supported at its marginal edges by a stiff paper frame.

BACKGROUND AND PRIOR ART

Air filters comprising a filter element of fibrous material supported at its marginal edges by a stiff paper frame are well known in the prior art. Typically, such filters are generally rectangular in shape and are provided with a porous backing sheet, e.g., bottlecap scrap, supported by the filter frame adjacent to the filter element. Various cross-sectional configurations for the filter frame have been developed in the prior art. For example, Greason, U.S. Pat. No. 3,003,581, disclosed a conventional air filter in which the frame is channel-shaped in cross section, while Dow, U.S. Pat. No. 2,965,197, discloses a cross-sectional configuration in the form of an isosceles triangle and Kershaw, U.S. Pat. No. 3,938,973, discloses a cross section in the shape of a right triangle. These filters are generally lightweight in construction but somewhat bulky to handle in shipment and storage.

When packaged for shipment or storage, a plurality or filters are packed in a single container, e.g., a dozen per box. Although each filter is light in weight, it occupies a relatively large amount of space in contrast to its small weight. Since shipping and storage costs are usually based on volume, there are relatively high transportation costs associated with these filters. Indeed, the shipping and storage costs represent a considerable part of the total cost of the filters to consumers. As a result, it is highly advantageous to provide an air filter construction which requires less space for shipment and storage than the conventional filters known in the art.

There have been previous attempts in the prior art to reduce the shipping and storage space required for air filters. Several proposals have involved the design of a filter frame which is collapsible to allow the air filters to be compressed into a smaller space for shipment or storage. Examples of this type of proposal are disclosed in Hickin, U.S. Pat. No. 3,429,434; Getzin, U.S. Pat. No. 3,467,257; and Champlin, U.S. Pat. No. 4,086,071. However, the collapsible air filter structure has not yet received any widespread commercial acceptance. In addition, it has been proposed to provide air filters with flared frames to permit a set of filters to be more compactly packaged in a container for shipment and storage. Examples of the flared frame construction are disclosed in Best, U.S. Pat. No. 3,023,839; Copenhefer, U.S. Pat. Nos. 3,830,045 and 3,970,440; and Latakas, U.S. Pat. No. 4,105,423. However, the flared frame designs have been somewhat less rigid in construction than the conventional filter frames.

In view of the constantly escalating costs of transportation, there is a definite need for improvements in the construction of existing air filters to allow the filters to be more compactly packaged to conserve space and minimize shipping and storage costs. Moreover, it is highly desirable to provide an air filter construction which achieves the same strength and rigidity associated with the conventional air filters already known.

SUMMARY OF INVENTION

A primary object of the present invention is to provide an air filter which can be packaged in a compact space for shipment or storage.

Another object of the invention is to provide an air filter in which the filter frame is adapted to nest with the frame of another air filter to permit both filters to be packed into a more compact space.

It is also an object of the invention to provide an air filter in which the filter frame includes a set of indentations located at opposite corners which permit a plurality of filters to nest together in a compact space for shipment or storage.

A further object of the invention is to provide an improvement in the construction of a conventional air filter in which the filter frame is provided with a set of recesses adjacent to diagonally opposite corners of the frame which receive the frame of another air filter to allow the filters to nest together in a laterally offset relationship to conserve space.

It is a further object of the invention to provide an improvement in the construction of rectangular air filters which is readily adaptable to filter frames of various cross-sectional configurations to allow a plurality of air filters to be more effectively packed together in a container which occupies less space than required by conventional packaging techniques.

These objectives are achieved in an air filter including a filter element of fibrous material and a frame for supporting the filter element at its marginal edges by providing a set of indentations formed in the filter frame at positions adjacent to opposite corners of the frame which are each adapted to receive the frame of another air filter to allow the filters to nest together in a compact space. Preferably, a pair of recesses is formed in the same face of the filter frame and located along adjacent sides of the frame adjacent to its diagonally opposite corners. The recesses are spaced from the opposite corners of the filter frame by substantially the same distance to allow both filters to nest together in a laterally off-set relationship. Preferably, each recess extends into the filter frame up to a depth equal to $\frac{1}{2}$ of the thickness of the frame.

The concept of this invention can be readily employed with all types of conventional air filters. For example, it is readily adaptable to air filter frames with channel-shaped cross-sectional configurations and to filter frames with triangular cross-sectional configurations, i.e., either isosceles or right triangles. Moreover, the invention can be employed with these conventional air filter frames without diminishing the strength and rigidity of the frames.

The present invention can be most advantageously utilized in connection with conventional air filters in which the cross-section of the filter frame has the configuration of an isosceles or equilateral triangle. This type of filter construction is illustrated in Dow, U.S. Pat. No. 2,965,197. Each filter frame is provided with a set of notches located adjacent to diagonally opposite corners of the frame which are each adapted to receive the frame of another air filter to enable a plurality of air filters to be stacked in a compact space with alternate air filters in the stack laterally displaced with respect to the remaining air filters. For example, the set of notches may comprise a pair of notches formed in the same face of the filter frame and located along adjacent sides of the frame at positions adjacent to its opposite corners. The recesses are spaced from diagonally opposite corners of the filter frame by substantially the same distance to permit adjacent filters to nest together in a laterally off-set relationship for shipment or storage. Alternatively, a pair of notches may be formed at each of two diagonally opposite corners of the frame with the two notches of each pair located at positions equally spaced from the respective corner along the adjacent sides of the frame which intersect at the corner. The notches may be formed on either the front or back of the filter frame. Alternatively, one pair of notches may be formed at one corner on the front of the filter frame, while another pair of notches may be formed at the diagonally opposite corner on the back of the frame. Any suitable arrangement of notches on the front or back of the filter frame which permit the filters to be arranged in a stack with adjacent filters nested together within the notches and with alternate air filters in the stack laterally displaced relative to the remaining filters may be employed.

The concept of this invention is also embodied in a method of nesting a plurality of air filters with rectangular frames together in a compact space, which comprises providing a set of notches in the frame of each air filter at positions adjacent to diagonally opposite corners of the frame, arranging the plurality of air filters in a stack with alternate air filters in the stack being displaced diagonally relative to each other, and each of the notches being adapted to receive the frame of an adjacent air filter to permit the stack of filters to nest together in a compact space. Preferably, the notches are arranged to permit each air filter in the stack, except the first and last, to nest with both of its neighbors. The notches may be formed on either the same face of each filter frame, or on opposite faces of the filter frame, at positions adjacent to diagonally opposite corners of the frame. The air filters may be stacked either vertically or horizontally.

BRIEF DESCRIPTION OF THE DRAWINGS

The accompanying drawings illustrate preferred embodiments of the invention and, together with the description, serve to explain the principles of the invention. In the drawings:

FIGS. 6A-6D illustrate a set of stiff paper strips used to form the frame of the air filter of FIG. 1;

FIG. 7 is an enlarged perspective view of one corner of the air filter frame illustrating the recess formed adjacent to the corner of the frame;

FIG. 8 is a cross-sectional view of an air filter with a filter frame which is an isosceles triangle in cross section;

FIG. 9 is a front perspective view of the air filter of FIG. 8 illustrating the location of a pair of recesses adjacent to opposite corners of the frame;

FIG. 10 illustrates a pair of air filters which are nested together in a laterally off-set relationship;

FIG. 11 illustrates a plurality of air filters arranged for packaging in a container;

FIG. 12 is an enlarged perspective view of one corner of the air filter of FIG. 9 illustrating the recess formed adjacent to the corner of the frame;

FIG. 13 illustrates an elongated strip of stiff paper which is scored and folded to form the filter frame of FIGS. 8 and 9;

FIG. 14 is a cross-sectional view of an air filter with a filter frame which is a right triangle in cross section;

FIG. 15 is a front perspective view of the air filter of FIG. 14;

FIG. 16 illustrates a pair of air filters which are nested together in a laterally offset relationship;

FIG. 17 illustrates a plurality of air filters arranged for packaging in a container; and FIGS. 18-23 illustrate additional embodiments of nesting air filters within the scope of the invention.

DETAILED DESCRIPTION OF PREFERRED EMBODIMENTS

Figure 1:
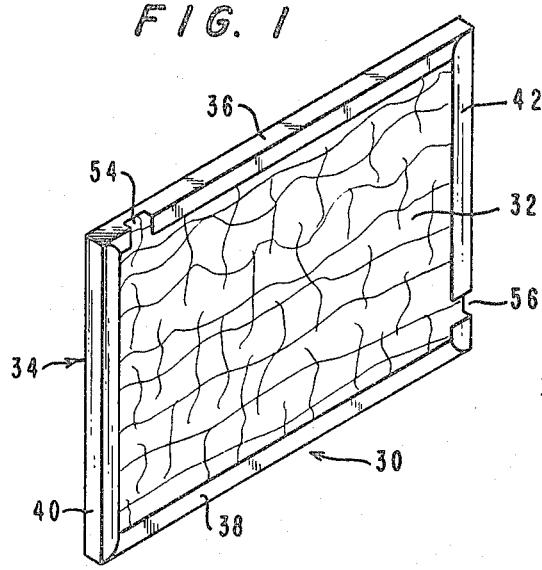
FIG. 1 is a front perspective view of an air filter with a filter frame of channel-shaped cross section illustrating a pair of recesses formed in its front face adjacent to opposite corners of the frame.

Referring to FIG. 1, an air filter, generally 30, comprises a filter element 32 of fibrous material, e.g., glass or polyester fibers, and a frame 34 which supports the filter element at its marginal edges. Preferably, filter element 32 and frame 34 are rectangular in shape to provide an air filter of rectangular configuration. Filter frame 34 includes a pair of horizontal frame members 36 and 38 and a pair of vertical frame members 40 and 42 which define the four sides of the rectangular frame. The frame members may be made of paperboard, metal, plastic or other suitable material and formed individually or from a continuous strip of material.

Filter element 32 consists of a suitable filter medium which readily permits an air flow therethrough and serves to trap undesirable particles in the air flow. For example, the filter medium may be a mixture of coarse and fine fiberglass fibers which are formed into a mass of substantially uniform thickness. The mass of fibers is secured together by a suitable bonding agent which will not have any appreciable effect on the air flow through the filter material. Alternatively, the filter medium may be made of polyester fibers.

Figure 2:
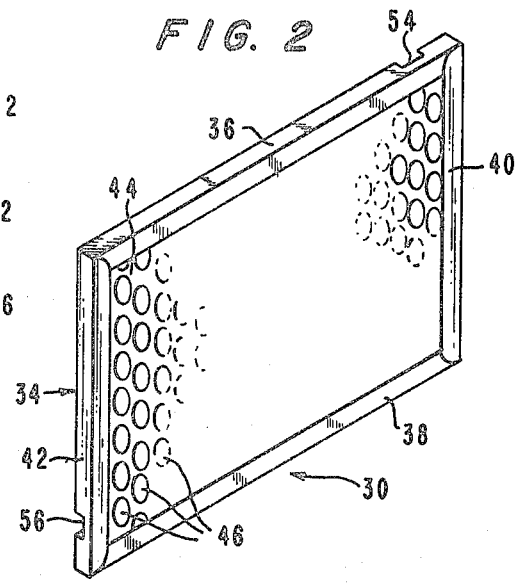
FIG. 2 is a rear perspective view of the air filter of FIG. 1.

As shown in FIG. 2, air filter 30 includes a rectangular backing sheet 44 which is supported at its marginal edges by frame 34 and located adjacent to the filter element. Preferably, backing sheet 44 consists of a thin metal, plastic or paperboard sheet provided with a plurality of closely spaced, circular air flow openings 46. For example, conventional material known as bottlecap scrap may be employed. The backing sheet may be formed separately or as an integral part of the filter frame.

Figure 3:
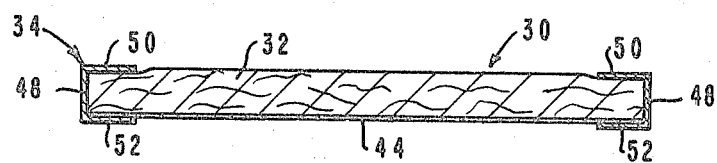
FIG. 3 is a horizontal cross section of the air filter of FIG. 1.

Preferably, each frame member of air filter 30 is channel-shaped in cross section to define a trough for receiving the marginal edges of rectangular filter element 32. As shown in FIG. 3, each frame member includes an outer wall 48 and a pair of side walls 50 and 52 extending perpendicularly inward from the outer wall to receive filter element 32 therebetween. Side wall 50 is secured by a strip of adhesive to filter element 32, and side wall 52 is secured by a strip of adhesive to filter element 32 and backing sheet 44.

In accordance with the invention, a set of indentations is formed in the filter frame at positions adjacent to opposite corners of the frame which are each adapted to receive the frame of another air filter allow the filters to nest together in a comact space. As shown in FIG. 1, filter frame 34 is provided with a set of indentations or recesses 54 and 56 formed in the front face of the frame. Recesses 54 and 56 are located along adjacent sides of filter frame 34, provided by frame members 36 and 42, respectively. Recess 54 is located adjacent to the corner of frame 34 defined by the intersection of frame members 36 and 40, and recess 56 is located adjacent to the opposite corner defined by the intersection of frame members 38 and 42. Preferably, recesses 54 and 56 are spaced from the respective corners of the filter frame by substantially the same distance. The recesses may be formed in the frame members 36 and 42 prior to assembly of the frame. Alternatively, the recesses may be cut into the filter frame after its frame members are assembled.

Referring to FIG. 7, recess 54 is formed by a rectangularly shaped, cutaway portion of frame member 36. Recess 54 extends through side wall 50 of frame member 36 into outer wall 48 of the frame member. Recess 56 is similarly formed.

In the case of a conventional 16"×20"×1" filter frame, recesses 54 and 56 are spaced at approximately 1½ inches from the respective corners of the frame. Each recess is approximately 1 inch in width to permit the recess to receive the frame members of another air filter. Preferably, each recess extends into outer wall 48 of the filter frame up to a depth equal to ½ of the thickness of the frame.

Figure 4:
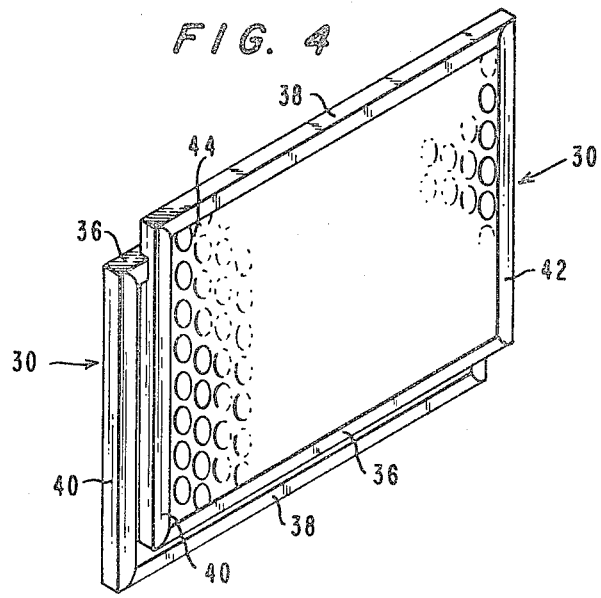
FIG. 4 illustrates a pair of air filters which are nested together in a laterally offset relationship.
Figure 5:
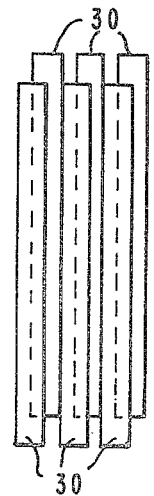
FIG. 5 is an edge view illustrating the arrangement of a plurality of air filters for packaging in a container.

As shown in FIG. 4, the recesses permit a pair of air filters 30 placed in face-to-face orientation to nest together in a laterally offset relationship. However, since the backing sheet of each air filter in the nested pair is faced outwardly, no further nesting of these filters is possible. As shown in FIG. 5, when a plurality of such filters are packaged together for shipment or storage, each pair of nested filters can be packaged in less space than required in the case of conventional filters without recesses. If each recess extends to a depth of ½ of the thickness of the filter frame, each nested pair of filters can be packaged in approximately 25% less volume. However, in view of the offset relationship between nested filters, a container of slightly greater length and height is required. Nevertheless, the recessed filter configuration allows four filters to be packaged in the same width where only three conventional filters could be previously contained. Thus, a box previously capable of holding a dozen filters could, with a slight increase of its length and height, accommodate 16 filters without any change in its width. The filters may be stacked either vertically or horizontally in the box.

The capability of a pair of filters of the type shown in FIG. 1 to nest together in less space may be enhanced by increasing the depth of recesses 54 and 56. Alternatively, both filters may be provided with recesses which are appropriately positioned such that the recesses on the first filter mate with the recesses on the second filter. When each of the mating recesses extends to a depth equal to one-half of the thickness of the filter frame, two filters can be nested together in the same thickness as one.

Referring to FIGS. 6A-6B, filter frame 34 is preferably assembled from four elongated strips of stiff paper which form horizontal frame members 36 and 38 and vertical frame members 40 and 42. Each paper strip is provided with two spaced longitudinal fold lines 58 along which the strip is folded to define outer walls 48 and side walls 50 and 52 of the frame member. Paper strips 36 and 42 are provided with rectangular cut out portions which define recesses 54 and 56 when the paper strips are folded and assembled. Alternatively, the filter frame may be formed from a single elongated strip of stiff paper which is initially folded into a channel-shaped configuration and subsequently folded transversely into a closed, rectangular configuration.

As shown in FIG. 18, in an alternative embodiment of the invention, air filter 30 is provided with recesses 54 and 56 located on the same frame member 36 adjacent to the corners of filter frame 34 defined by the intersections of frame member 36 with frame members 40 and 42, respectively. This arrangement of recesses permits a pair of such air filters placed in face-to-face orientation and rotated by 180° relative to each other to nest together in a laterally offset relationship with the frame of the first air filter received in recess 54 on the second air filter and the frame of the second air filter received in recess 56 on the first air filter. Alternatively, each filter may be provided with only a single notch in its frame which is located adjacent to the appropriate corner to permit the nesting of a pair of such filters arranged in face-to-face orientation.

Referring to FIGS. 8-10, the present invention can also be employed in an air filter 60 with a filter frame which is an isosceles triangle in cross section. This type of filter is disclosed in Dow, U.S. Pat. No. 2,965,197. As shown in FIG. 9, air filter 60 includes a rectangular filter element 62 of fibrous material, e.g., glass or polyester fibers, and a rectangular frame 64 which supports the filter element at its marginal edges. Frame 64 includes a pair of horizontal frame members 66 and 68 and a pair of vertical frame members 70 and 72. Preferably, frame 64 is formed from a single continuous strip of stiff paperboard. Alternatively, the frame members may be individually formed and secured together, and other materials such as metal or plastic may be employed.

A rectangular backing sheet 74 is supported at its marginal edges by filter frame 64 and located adjacent to filter element 62. Preferably, backing sheet 74 consists of a thin metal sheet, e.g., bottlecap scrap, provided with a plurality of closely spaced, circular air flow openings. Alternatively, a plastic or paperboard backing sheet may be employed.

As shown in FIG. 8, filter frame 64 is triangular in cross section and defines a trough which receives the marginal edges of filter element 62. Each frame member includes an outer wall 76 and a pair of symmetrically inclined side walls 78 sloping toward each other to receive filter element 62 therebetween. Backing sheet 74 is located between filter element 62 and one side wall of the filter frame. Each side wall 78 terminates in a flange 80 disposed at right angles to outer wall 76. Flanges 80 are secured together, e.g., by an adhesive, with filter element 62 compressed therebetween to hold the frame, filter element, and backing sheet together.

As shown in FIG. 9, a set of indentations or recesses 82 and 84 is formed in the front face of filter frame 64 and located adjacent to diagonally opposite corners of the frame. Recesses 82 and 84 are located along the adjacent sides of filter frame 64 defined by frame members 66 and 72. Recess 82 is located adjacent to the corner defined by frame members 66 and 70, and recess 84 is located adjacent to the opposite corner defined by frame members 68 and 72. Preferably, recesses 82 and 84 are spaced from the respective corners of the filter frame by substantially the same distance. The recesses may be formed in frame members 66 and 72 prior to the assembly of the frame. Alternatively, the recesses may be cut into the frame after it is assembled. If desired, the recesses may be formed on the back of the filter frame.

Referring to FIG. 12, recess 82 is defined by a generally rectangular cutaway portion of frame member 66. The recess extends from flange 80 through one side wall 78 of frame member 66 into its outer wall 76. Preferably, recess 82 extends into outer wall 76 up to a depth equal to $\frac{1}{2}$ of the thickness of the filter frame. As shown in FIG. 12, a portion 81 of flange 80 located adjacent to recess 82 remains intact with side wall 78 and secured to the flange of the opposed side wall to maintain the rigidity of the filter frame. The cut out portion of the filter frame which defines recess 82 may be left intact with flange 80 to provide a flap 86 which is bent into the interior of the filter frame to cover the marginal edge of filter element 62. If desired, flap 86 may be completely removed from the filter frame. Recess 84 is similarly formed in frame member 72. Alternatively, the recesses may consist of V-shaped notches formed in the filter frame. Any suitable configuration may be employed which allows the filter frame to nest with another filter frame of similar shape.

In the case of a conventional 20"×20"×1" filter frame, recesses 82 and 84 are spaced at approximately on inch (1") from the respective corners of the frame. Each recess is approximately one-half inch ($\frac{1}{2}$") in width to permit the recess to receive the frame members of another air filter. Preferably, each recess extends into outer wall 76 of the filter frame up to a depth equal to one-half of the thickness of the frame.

As shown in FIG. 10, the recesses provided at diagonally opposite corners of the filter frame permit two filters to nest together in a laterally offset relationship. In this embodiment, the second frame is rotated by 180° relative to the first frame to appropriately position its recesses 82 and 84 to receive another filter frame. However, the invention is not limited to the use of only two recesses in the filter frame. For example, as shown in FIG. 19, a pair of recesses or notches may be provided at each of the diagonally opposite corners. The two notches of each pair are formed at positions equidistantly spaced from the respective corner along the adjacent sides of the frame which intersect at the corner. This arrangement of notches avoids the need to rotate the second frame by 180° in order to nest with the next frame. Alternatively, as shown in FIG. 20, one pair of notches 88 may be formed on the front of filter frame 64 adjacent to the corner defined by frame members 66 and 70, while the other pair of notches (not shown) may be formed on the back of the filter frame adjacent to the diagonally opposite corner defined by frame members 68 and 72.

Referring to FIG. 21, in another embodiment of the invention, each air filter 60 is provided with a pair of V-shaped notches 85 formed on the front of filter frame 64 adjacent to the corner defined by frame members 66 and 70, while another pair of V-shaped notches (not shown) may be formed on the back of the filter frame adjacent to the diagonally opposite corner defined by frame members 68 and 72. As shown in FIG. 22, each V-shaped notch 85 is formed by a triangularly shaped, cutaway portion of the filter frame. In the embodiment of FIG. 23, two pairs of V-shaped notches 85 and 87 are formed at diagonally opposite corners on the front of the filter frame.

Because filter frame 64 is an isosceles triangle in cross section, a plurality of air filters 60 can be stacked with each successive air filter except the first and last nested with both of its neighbors. As shown in FIG. 11, a plurality of air filters 60 can be packaged together in a compact configuration with alternate air filters in the stack laterally displaced relative to the remaining filters. If the recesses extend to a depth of equal to one-half of the thickness of the filter frame the nested filters can be packaged in approximately 50% of the space required in conventional filter packaging. For example, with only a slight increase in the length and height of the container, 23 nested filters can be packed into a box normally used to pack only a dozen filters without any change in its width. Thus a significant conservation of space and savings of transportation costs can be achieved. The filters may be stacked either vertically or horizontally.

There are additional notch arrangements which may be employed with the filter of FIG. 8 to achieve the nesting air filters of the present invention. For example, it is possible to use single notches on the front and back of the filter frame at positions adjacent to diagonally opposite corners of the frame to allow a stack of filters to nest together in the laterally offset relationship shown in FIG. 11. In addition, mating notches may be employed on successive filters in the stack to allow the nesting of the filters. Further, it is possible to suitably notch filters 60 to permit unnotched filters to be alternated with notched air filters in a laterally offset relationship.

FIG. 13 illustrates an elongated strip 90 of stiff paper which is notched and scored to facilitate formation of filter frame 64 when the paper strip is appropriately folded. Paper strip 90 is scored on the same side along two spaced longitudinal lines 92 and 94 which extend for the entire length of the paper strip and define the outer wall and side walls of the frame. In addition, paper strip 90 is scored along a pair of longitudinal lines 96 on the opposite side of the paper strip adjacent to the upper and lower edges of the strip to define flanges 80 of the filter frame. The paper strip is also provided with a set of notches 98 which facilitate formation of the corners of the filter frame. A tongue 100 is provided at one end of the stiff paper strip to facilitate assembly of the frame when the strip is folded into its rectangular configuration.

Paper strip 90 is also provided with a set of rectangular cuts which define recesses 82 and 84 when the frame is assembled. The paper strip may be completely cut away in these areas or, as explained above, a flap may be left intact with the flange of the filter frame in each recess. Other suitably shaped recesses may be used.

In the assembly of the filter frame, paper strip 90 is initially bent into a trough-shaped configuration about fold lines 92 and 94. The strip is then bent at notches 98, which define the corners of the frame, into a rectangular configuration surrounding the filter element and backing sheet. Tongue 100 is employed to join the ends of the paper strip together. Thereafter, the paper strip is folded about fold lines 96 to define the flanges which are secured together through the filter element and backing sheet to hold the filter together.

Referring to FIGS. 14 and 15, the invention may also be employed in an air filter 110 with a filter frame which is a right triangle in cross section. This type of construction is disclosed in applicant's previous U.S. Pat. No. 3,938,973, which is incorporated herein by reference. Preferably, the filter is rectangular in shape.

As shown in FIG. 15, air filter 110 comprises a filter element 112 of fibrous material, e.g., glass or polyester fibers, and a frame 114 which supports the filter element at its marginal edges. Frame 114 includes a pair of horizontal frame members 116 and 118 and a pair of vertical frame members 120 and 122. A backing sheet 124 (FIG. 14) is supported at its marginal edges by frame 114 adjacent to filter element 112.

As shown in FIG. 14, each frame member is substantially a right triangle in cross section and includes an outer wall 126, a rear wall 128 extending inwardly at right angles to the outer wall, and a front wall 130 extending inwardly from the outer wall and sloping toward the rear wall. Backing sheet 124 is located between filter element 112 and rear wall 128 of the filter frame. Front wall 130 terminates in a flange 132 disposed in a parallel relationship with rear wall 128. Flange 132 is adhesively secured to rear wall 128 with filter element 112 compressed therebetween to hold the frame, filter element and backing sheet together.

As shown in FIG. 15, a set of recesses 134 and 136 is formed in the front face of filter frame 114 at positions adjacent to diagonally opposite corners of the frame. Recesses 134 and 136 are located along adjacent sides of the filter frame defined by frame members 116 and 122. Recess 134 is located adjacent to the frame corner defined by frame members 116 and 120, and recess 136 is located adjacent to the opposite corner defined by frame members 118 and 122. Preferably, recesses 134 and 136 are spaced from the opposite corners of the filter frame by substantially the same distance to allow a pair of filters to nest together in a laterally offset relationship (FIG. 16). As shown in FIG. 17, adjacent pairs of nested filters can be packaged in a compact space within a shipping and storage container.

In an alternative embodiment (not shown), recesses 134 and 136 may be located on the same frame member 116 adjacent to the corners of the filter frame 114 defined by the intersections of frame member 116 with frame members 120 and 122, respectively. This arrangement permits a pair of such air filters placed in face-to-face orientation and rotated by 180° relative to each other to nest together in a laterally offset relationship with the frame of the first air filter received in recess 134 on the second air filter and the frame of the second air filter received in recess 136 on the first air filter. Alternatively, each filter may be provided with only a single notch in its frame which is located adjacent to the appropriate corner to permit the nesting of a pair of such filters arranged in face-to-face orientation.

Preferably, filter frame 114 consists of a single, continuous strip of stiff paper which is notched and scored to facilitate formation of the frame into its desired configuration. The strip is folded longitudinally to define the triangular cross section of the filter frame and transversely to define the four sides and corners of the frame. Alternatively, the frame members may be individually formed, and other materials such as metal or plastic may be employed. Backing sheet 124 preferably consists of a thin metal sheet, e.g., bottlecap scrap, provided with a plurality of closely-spaced circular air flow openings. Alternatively, the backing sheet may be made of plastic or paperboard and it may be formed as an integral part of the frame.

The invention in its broader aspects is not limited to the specific details shown and described, and modifications may be made in the details of the nesting air filter embodiments without departing from the principles of the present invention.

What is claimed is:

1. In a stack of air filters each including a filter element of fibrous material and a quadrangular frame for supporting said filter element at its marginal edges, the improvement comprising:
a set of recesses formed in each filter frame at positions adjacent to diagonally opposite corners of said frame, each of said recesses being adapted to receive the frame of another air filter, said air filters being stacked with first and second air filters in the stack overlapped and arranged in a laterally offset relationship and subsequent air filters in the stack also overlapped and arranged in a laterally offset relationship and with the recesses of each air filter receiving the frame of the next air filter in the stack to allow said first and second air filters to nest together and to allow said second air filter and each subsequent air filter to nest with the next air filter in the stack.

2. A stack of air filters, each including a filter element of fibrous material and a quadrangular frame for supporting the filter element at its marginal edges, comprising:
a plurality of air filters arranged in a stack with first and second air filters laterally offset relative to each other and subsequent air filters in the stack also laterally offset relative to each other and with the frames of successive air filters in the stack overlapping at positions adjacent to diagonally opposite corners of the frames; and
a plurality of recesses formed in the frames of the air filters at said positions adjacent to the diagonally opposite corners of the overlapping frames, each of said recesses receiving the frame of an adjacent air filter in the stack to allow said first air filter to nest with said second air filter and to allow said second air filter and each subsequent air filter to nest in succession with the next air filter in the stack.

3. The air filters of claim 1 or 2, wherein:
at least two recesses are formed on the same face of each filter frame and located along adjacent sides of said frame at positions adjacent to said opposite corners.

4. In a stack of air filters of rectangular shape each including a filter element of fibrous material and a rectangular frame for supporting said filter element at its marginal edges, the improvement comprising:
a set of notches formed on each filter frame at positions adjacent to diagonally opposite corners of said frame, each of said notches being shaped to receive the frame of an adjacent air filter of rectangular shape, said air filters being stacked with first and second air filters in the stack laterally offset relative to each other and subsequent air filters alternately aligned with the first and second air filters, respectively, and with the notches of each successive air filter receiving the frame of the next air filter in the stack to allow said first and second air filters to nest together and to allow said second air filter and each subsequent air filter to nest in succession with the next air filter in the stack.

5. A stack of air filters, each including a filter element of fibrous material and a rectangular frame for supporting the filter element at its marginal edges, comprising:

a plurality of air filters arranged in a stack with first and second air filters laterally offset relative to each other and subsequent air filters alternately aligned with the first and second air filters, respectively, and with the frame of each air filter overlapping the frames of the adjacent air filters in the stack at positions adjacent to diagonally opposite corners of the frames; and a plurality of notches formed in the frames of the air filters at said positions adjacent to the diagonally opposite corners of the overlapping frames, each of said notches receiving the frame of an adjacent air filter in the stack to allow said first air filter to nest with said second air filter and to allow said second air filter and each subsequent air filter to nest in succession with the next air filters in the stack.

6. The air filters of claim 4 or 5, wherein:

a pair of notches is formed at each of two diagonally opposite corners of each filter frame with the two notches of each pair located at positions equidistantly spaced from the respective corner along the adjacent sides of said filter frame intersecting at the corner.

7. The air filters of claim 6, wherein both pairs of notches are formed in the same face of each filter frame.

8. The air filters of claim 6, wherein one pair of notches is formed on the front and the other pair of notches is formed on the back of each filter frame.

9. The air filters of claim 5, wherein unnotched air filters are alternately stacked with notched air filters in a laterally offset relationship.

10. An air filter of rectangular shape adapted to nest with other air filters of the same configuration in a compact space, comprising:

a filter element of fibrous material;

a paperboard frame for supporting said filter element at its marginal edges;

said frame being formed as a trough in cross section and arranged to form a closed, rectangular configuration surrounding said filter element to receive said marginal edges of said filter element in said trough;

said frame including an outer wall and a pair of inclined side walls sloping toward each other to receive said filter element therebetween;

each of said side walls terminating in a flange disposed substantially at right angles to said outer wall, said flanges being secured together with said filter element compressed therebetween to hold said frame and said filter element together; and a pair of recesses formed at each of two diagonally opposite corners of said frame with the two recesses of each pair located at positions equidistantly spaced from the respective corner along the adjacent sides of said frame intersecting at the corner, each of said recesses comprising a partially cutaway portion of said frame extending into said outer wall and one of said side walls of said frame, said flange of said one side wall remaining intact therewith and secured to said flange of said other side wall adjacent to said recess to maintain the rigidity of said frame, each recess being shaped to receive the frame of another air filter of the same quadrangular shape with the filters arranged in an overlapping, laterally offset relationship to allow said filters to nest together in a compact space.

11. The air filter of claim 10, wherein both pairs of recesses are formed on the same face of said filter frame.

12. The air filter of claim 10, wherein one pair of recesses is formed on the front and the other pair of recesses is formed on the back of said filter frame.

13. An air filter of rectangular shape adapted to nest with another air filter of the same configuration in a compact space, comprising:

a filter element of fibrous material;

a paperboard frame for supporting said filter element at its marginal edges;

said frame being formed as a trough in cross section and arranged to form a closed, rectangular configuration surrounding said filter element to receive said marginal edges of said filter element in said trough;

said frame including an outer wall and a pair of inclined side walls sloping toward each other to receive said filter element therebetween;

each of said side walls terminating in a flange disposed substantially at right angles to said outer wall, said flanges being secured together with said filter element compressed therebetween to hold said frame and said filter element together; and said frame including a set of recesses formed at positions adjacent to diagonally opposite corners of said frame, each of said recesses comprising a partially cutaway portion of said frame extending into said outer wall and one of said side walls of said frame, said flange of said one side wall remaining intact therewith and secured to said flange of said other side wall adjacent to said recess to maintain the rigidity of said frame, each recess being shaped to receive the frame of another air filter of the same rectangular shape with the filters arranged in an overlapping, laterally offset relationship to allow said filters to nest together in a compact space.

14. An air filter of rectangular shape adapted to nest with another air filter of the same configuration in a compact space, comprising:

a filter element of fibrous material;

a paperboard frame for supporting said filter element at its marginal edges;

said frame being formed as a trough in cross section and arranged to form a closed, rectangular configuration surrounding said filter element to receive said marginal edges of said filter element in said trough;

said frame including an outer wall, a first side wall extending perpendicularly inward from said outer wall toward said filter element, and a second side wall extending inward from said outer wall toward said filter element and sloping toward said first side wall;

said second side wall terminating in a flange disposed in a parallel relationship with said first side wall, said flange being secured to said first side wall with said filter element compressed therebetween to hold said frame and said filter element together; and said frame including a set of recesses formed at positions adjacent to diagonally opposite corners of said frame, each of said recesses comprising a partially cutaway portion of said frame extending into said outer wall and said second side wall of said frame, said flange of said second side wall remaining intact therewith and secured to said first side wall adjacent to said recess to maintain the rigidity of the frame, each recess being shaped to receive the frame of another air filter of the same rectangular shape with the filters arranged in an overlapping, laterally offset relationship to allow said filters to nest together in a compact space.

15. The air filter of claim 13 and 14, wherein:
each cutaway portion of said filter frame extends from said flange through said side wall into said outer wall of said frame.

16. The air filter of claim 15, wherein:
each cutaway portion of said filter frame is rectangular in configuration.

17. A method of nesting a plurality of air filters, each including a filter element of fibrous material and a quadrangular frame for supporting the filter element at its marginal edges, together in a compact space, comprising:
providing a set of recesses in the frame of each air filter at positions adjacent to diagonally opposite corners of the frame, each of said recesses being adapted to receive the frame of another air filter; and
arranging the plurality of air filters in a stack with first and second air filters overlapped and laterally offset relative to each other and subsequent air filters in the stack also overlapped and arranged in a laterally offset relationship and with the recesses of each air filter receiving the frame of the next air filter in the stack to allow said first and second air filters to nest together and to allow said second air filter and each subsequent air filter to nest with the next air filter in the stack.

18. A method of nesting a plurality of air filters, each including a filter element of fibrous material and a quadrangular frame for supporting the filter element at its marginal edges, together in a compact space, comprising:
arranging the plurality of air filters in a stack with first and second air filters laterally offset relative to each other and subsequent air filters in the stack also laterally offset relative to each other and with the frames of successive air filters in the stack overlapping at positions adjacent to diagonally opposite corners of the frames; and
providing recesses in the frames of the air filters at said positions adjacent to the diagonally opposite corners of the overlapping frames, each of said recesses receiving the frame of an adjacent air filter in the stack to allow said first air filter to nest with said second air filter and to allow said second air filter and each subsequent air filter to nest in succession with the next air filter in the stack.

19. The method of claim 17 or 18, wherein:
at least two recesses are formed on the same face of each filter frame and located along adjacent sides of said frame at positions adjacent to said opposite corners.

20. A method of nesting a plurality of air filters, each including a filter element of fibrous material and a rectangular frame for supporting the filter element at its marginal edges, together in a compact space, comprising:
providing a set of notches in the frame of each air filter at positions adjacent to diagonally opposite corners of the frame, each of said notches being shaped to receive the frame of another air filter; and
arranging the plurality of air filters in a stack with first and second air filters laterally offset relative to each other and subsequent air filters in the stack alternately aligned with the first and second air filters, respectively, and with the notches of each air filter receiving the frame of the next air filter in the stack to allow said first and second air filters to nest together and to allow said second air filter and each subsequent air filter to nest in succession with the next air filter in the stack.

21. A method of nesting a plurality of air filters, each including a filter element of fibrous material and a rectangular frame for supporting the filter element at its marginal edges, together in a compact space, comprising:
arranging the plurality of air filters in a stack with first and second air filters laterally offset relative to each other and subsequent air filters alternately aligned with the first and second air filters, respectively, and with the frame of each air filter overlapping the frames of the adjacent air filters in the stack at positions adjacent to diagonally opposite corners of the frames; and
providing notches in the frames of the air filters at said positions adjacent to the diagonally opposite corners of the overlapping frames, each of said notches receiving the frame of an adjacent air filter in the stack to allow said first air filter to nest with said second air filter and to allow said second air filter and each subsequent air filter to nest in succession with the next air filters in the stack.

22. The method of claim 20 or 21, wherein a pair of notches is formed at each of two diagonally opposite corners of each filter frame with the two notches of each pair located at positions equidistantly spaced from the respective corner along the adjacent sides of said filter frame intersecting at the corner.

23. The method of claim 22, wherein both pairs of notches are formed on the same face of each filter frame.

24. The method of claim 22, wherein one pair of notches is formed on the front and the other pair of notches is formed on the back of each filter frame.

25. The method of claim 21, wherein unnotched air filters are alternately stacked with notched air filters in a laterally offset relationship.

* * * * *